United States Patent
Weinberg

Patent Number: 5,436,531
Date of Patent: Jul. 25, 1995

[54] FLASH TRIGGERING SYSTEM

[76] Inventor: Stanley Weinberg, 575 Tigertail Rd., Los Angeles, Calif. 90049

[21] Appl. No.: 343,847

[22] Filed: Nov. 23, 1994

Related U.S. Application Data

[63] Continuation-in-part of Ser. No. 127,961, Sep. 27, 1993.

[51] Int. Cl.⁶ .............................. H05B 37/00
[52] U.S. Cl. ..................... 315/241 P; 315/241 S; 315/200 A; 315/129; 254/129
[58] Field of Search ............... 315/241 S, 241 P, 129, 315/200 A; 455/99; 356/23; 354/410, 131, 132, 129; 340/641

[56] References Cited

U.S. PATENT DOCUMENTS

| | | |
|---|---|---|
| Re. 28,100 | 8/1974 | Long . |
| 3,487,221 | 12/1969 | Frank ........................ 315/241 P |
| 3,601,652 | 8/1971 | Burnett, Jr. ............... 315/241 P |
| 3,626,401 | 12/1971 | Flieder et al. . |
| 3,662,168 | 5/1972 | Pelino et al. . |
| 4,234,967 | 11/1980 | Henschel . |
| 4,701,672 | 10/1987 | Sikora . |

*Primary Examiner*—Robert J. Pascal
*Assistant Examiner*—Reginald A. Ratliff
*Attorney, Agent, or Firm*—Price, Gess & Ubell

[57] ABSTRACT

A flash triggering system inductively coupled to a flash tube assembly's flash tube of a through-the-lens (TTL) strobe unit. The flash trigger monitors the electromagnetic field directly surrounding the strobe to which it is affixed using an electromagnetic inductive sensor. The photographic flash trigger is positioned by the mounting mechanism adjacent the flash tube so that the flash monitor detector is responsive to the excitation of a flash tube. The detector provides a detection signal indicative of whether or not the flash tube properly fired. A delay circuit delays any response for a predetermined time to allow for the main TTL flash cycle. Then, the activation circuit enables a separate transmitter to trigger the slave strobes while the camera shutter is still open.

5 Claims, 2 Drawing Sheets 5,436,531

FLASH TRIGGERING SYSTEM

This application is a continuation-in-part of application Ser. No. 08/127,961 filed Sep. 27, 1993.

BACKGROUND OF THE INVENTION

1. Field of the Invention

The present invention relates to a flash monitor for determining the excitation of a flash tube in photography and, more particularly, to a flash triggering system for synchronizing "fill-in" strobe flashes with a through-the-lens metering master strobe flash.

2. Description of Related Art

A recurring problem in the art of strobe flashes for photographic purposes is the problem of ensuring that additional strobes, other than the master strobe directly attached to the camera, fire in concert with the master strobe. Sometimes the additional or "slave" strobes are necessary to provide primary illumination to all or part of the photographed scene. More often the slave flashes are used for "fill-in" to lighten shadows in the scene and thereby avoid the harsh shadows caused by unidirectional illumination.

Although the slave flashes could be directly attached by cables to the master flash, it is more desirable to use some type of remote flash triggering system to trigger the slave flashes, thereby avoiding the need for cumbersome cables. Essentially, the flash triggering system detects the occurrence of the master flash and then triggers the slave flashes by means of infrared signals, radio waves, or other wireless methods.

Major problems with flash triggering systems are false alarms where the slave flashes are triggered without the master flash first firing, and missed alarms where the slave flashes are not triggered despite the firing of the master strobe flash. The photographic flash monitor triggering art is generally cognizant of flash triggering systems which utilize photosensors to detect light from the master flash and thereby trigger the slave flashes. Unfortunately, it is often difficult to properly set the sensitivity of photosensor-based devices. Insufficient sensitivity of the detector will result in missed alarms, while excess sensitivity will result in false alarms.

Although flash triggering systems are available, the art is still seeking an inexpensive, convenient, easily-mounted flash triggering system capable of reliably distinguishing between a true inductive flash tube discharge pulse which is associated with the proper firing of a flash tube and a high-voltage trigger pulse not followed by a discharge pulse, such a trigger pulse being associated with a flash tube misfire. Such a device can be used to reliably trigger remote slave flash units.

An additional problem has been posed by the growing popularity of Through-The-Lens (TTL) flash metering. With more traditional strobes the exposure (i.e., camera lens opening) is set according to distance of the flash from the object or, more modernly, by having a photosensor on the strobe that measures the light reflected from a scene to be photographed and cuts off the flash when sufficient light has been reflected from the scene. TTL metering goes one step farther and measures the reflected light at a film plane within the camera.

In many TTL systems a small photosensor inside the camera actually pops up in front of the film plane to obtain an accurate reading. Because the sensor would actually cast a shadow on the film, these systems work by having the master strobe produce a "preflash" for the sensor to read. The system calculates the correct exposure and then produces a "true" flash for the actual exposure with the photosensor out of the film plane. Such double flashing causes all sorts of problems for the slave strobes. It is important to trigger them for fill-in purposes when the camera shutter is open, but they should not interfere with the main flash of the TTL or with the sensing of the main exposure. Furthermore, the actual main TTL flash produces significant radio and optical interference that can confound the control signals from a flash triggering systems to remote slave flashes.

OBJECTS AND SUMMARY OF THE INVENTION

An object of the present invention is to provide a flash triggering system that allows the photographer to synchronize slave strobes with no danger of missed or false alarms;

Another object is to provide a flash triggering system which distinguishes between a true inductive flash tube discharge pulse which occurs only when the flash tube properly fires and a high-voltage trigger pulse, not followed by a discharge pulse, which occurs when the flash tube misfires;

Still another object is to provide a flash triggering system to detect the preflashes of a TTL system and then trigger the slave strobes for fill-in purposes without interfering with the TTL measurement; and A further object is to provide a flash triggering system that can trigger remote slave strobes without being impeded by the interference caused by the flash of the main TTL strobe.

The TTL and the other photographic flash triggering systems have a monitoring circuit that detects a change in the electromagnetic field surrounding the flash head. When a flash tube fires, a strong electromagnetic field is generated in its immediate proximity. The self-contained flash triggering system of the present invention can be mounted to detect the electromagnetic field and to activate slave strobe units. The flash triggering system does not respond to the light, per se; it monitors only the electromagnetic field directly surrounding the strobe to which it is affixed. The monitoring circuit uses an electromagnetic inductive sensor to detect the electromagnetic field The flash triggering device includes a mounting mechanism, a detector, a verification circuit, a delay circuit, and an activation circuit. The photographic flash triggering device is positioned by the mounting mechanism adjacent the flash tube such that the flash triggering detector is responsive to the excitation of the flash tube. The detector provides a detection signal indicative of when the flash tube fired. The verification circuit receives the detection signal and verifies a detection of a true inductive flash tube discharge pulse when the flash tube properly fires. When such a verified detection has been sensed, the delay circuit delays any response for a predetermined time to allow for a main flash cycle of a TTL strobe. Then, the activation circuit enables a transmitter to trigger the slave strobes while the camera shutter is still open.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a flash triggering system to synchronize fill-in strobes to a TTL master strobe.

Figure 1:
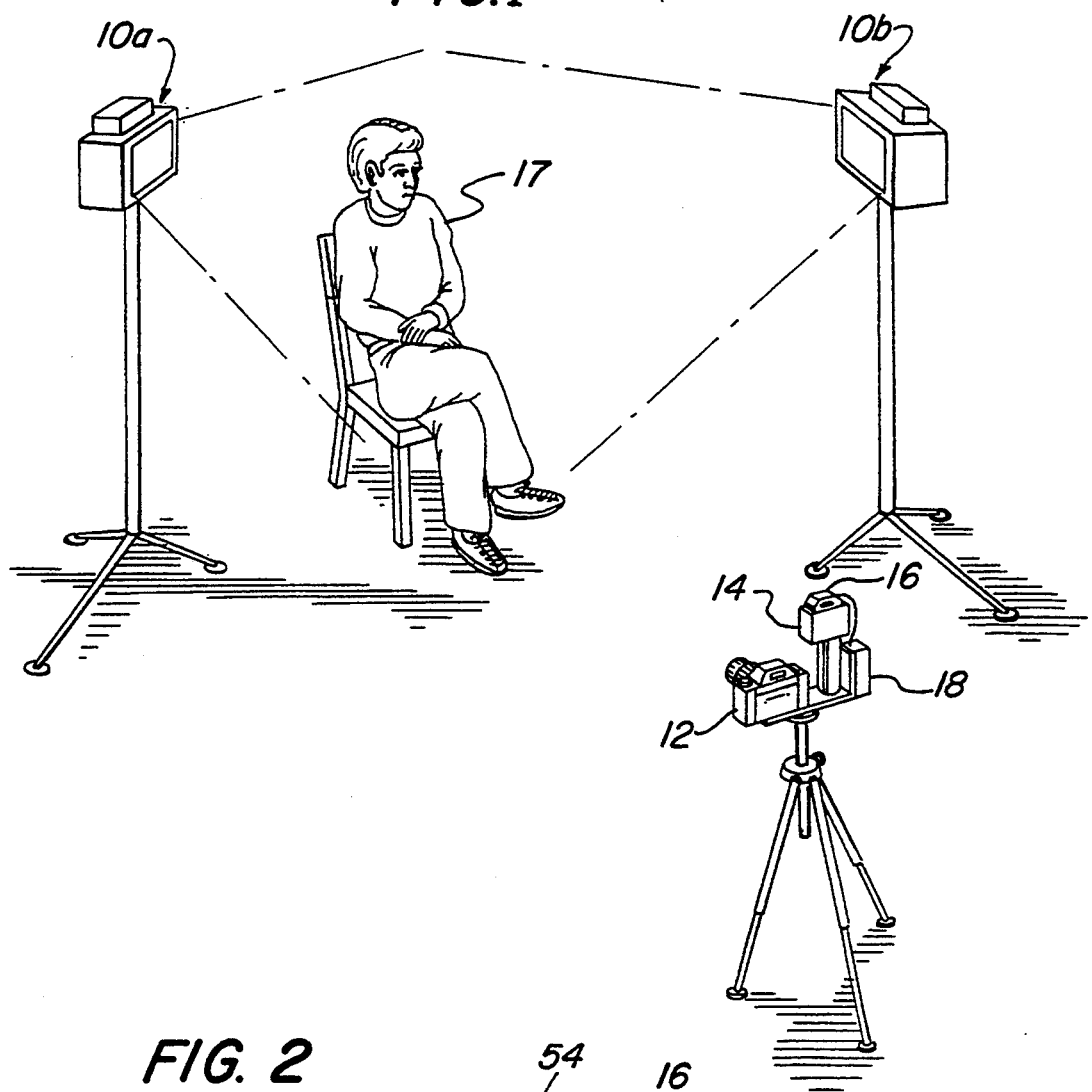
FIG. 1 is an illustration of a typical photographic setup with a flash triggering system mounted on an external surface of a TTL strobe and an attached transmitter controlling several slave strobes.

FIG. 1 exemplifies a typical photographic environment where several slave strobes, 10a, 10b, are arranged to provide fill-in illumination for a subject 17. A camera 12 is provided with a TTL strobe unit 14 which provides the main illumination for the scene. A flash triggering system 16 of the present invention is attached to the TTL strobe 14 in a position to detect the electromagnetic field of the flash firing. A transmitter 18 for the slave strobes 10a, 10b is attached to the TTL flash triggering system 16. In this preferred embodiment the transmitter 18 acts as a power source for the flash triggering system 16 so that the flash triggering system 16 does not contain any bulky batteries.

The present invention detects the occurrence of a flash by using mutual inductance to detect the electromagnetic pulse produced by the flash. Mutual inductance between two circuits results in the induction of an electro-motive force in one circuit by a change of current in the other. The respective current changes within the TTL strobe 14 over the period of time during which a proper flash occurs is detected by the flash trigger. Such current changes are indicative of whether the flash tube assembly properly fired (inductive energy characteristic of a true inductive discharge pulse emitted) or misfired (inductive energy characteristic of a high-voltage trigger pulse not followed by a discharge pulse emitted).

Figure 2:
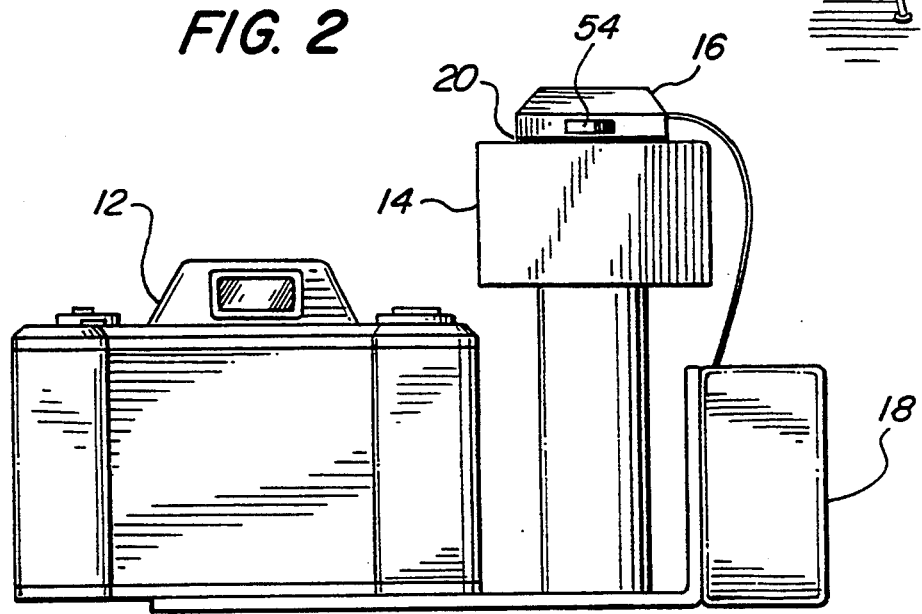
FIG. 2 is a schematic perspective of the flash triggering system which is mounted on an external surface of a TTL strobe with a mounting strip.

FIG. 2 depicts a TTL strobe 14 and a flash triggering system 16 attached. The flash triggering system 16 senses an inductive pulse from the strobe 14 by virtue of its proximity to a flash tube inside the TTL strobe 14. A mounting strip 20 is attached to the flash triggering system 16. There is a matching strip adhesively attached to an exterior surface of the strobe unit 14. The two strips comprise a typical VELCRO ™ (hook-in-loop) fastening system which facilitates quick attachment of the flash triggering system 16 to the TTL strobe 14.

Figure 3:
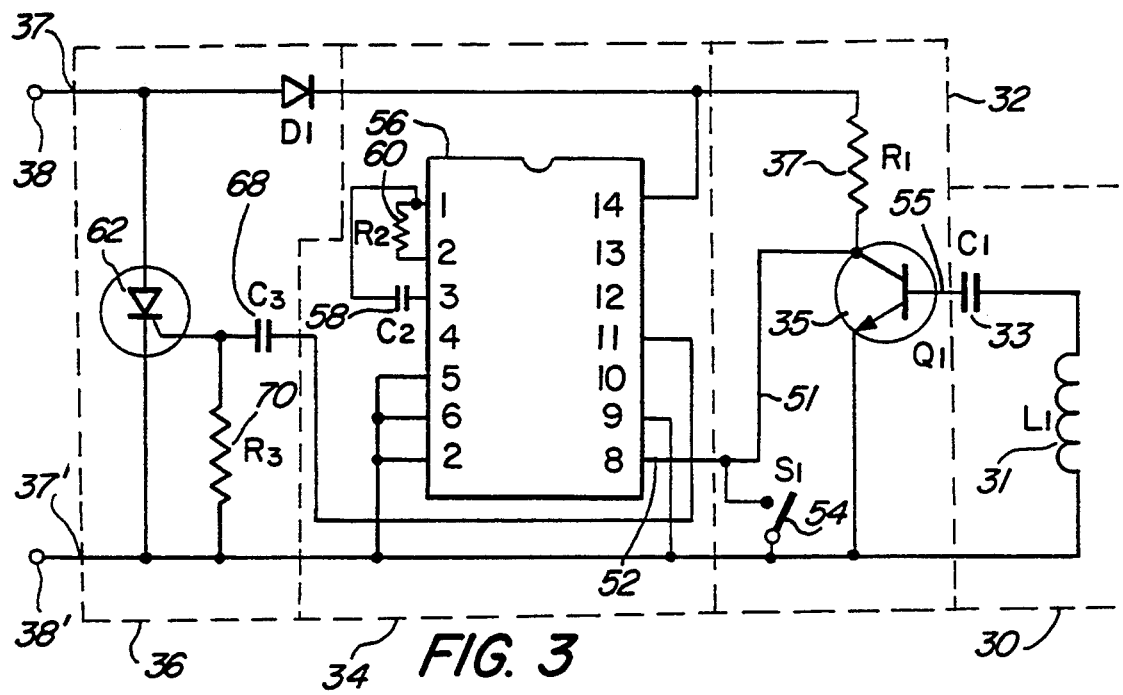
FIG. 3 is an electronic circuit schematic of the flash trigger electronics.

FIG. 3 shows a schematic of the circuit of flash trigger 16 which may be inexpensively assembled from relatively few electronic components. The electronics includes a detector 30, a verification circuit 32, a delay circuit 34, and an activation circuit 36. The circuit receives its operating power from the slave flash transmitter 18 which is attached across the output 38, 38' of the activation circuit 36. In this way, the flash triggering system 16 does not have to contain any batteries and, thus, may be kept advantageously small.

As shown in FIG. 3, the flash trigger electronics comprise the detector 30, the verification circuit 32, the delay circuit 34, and the activation circuit 36. Outputs 38, 38' are connected to inputs of the slave strobe transmitter 18. A voltage exists across the slave strobe transmitter inputs (not shown). Shorting the inputs causes the slave strobe transmitter 18 to transmit a "fire" signal to the slave strobes 10a, 10b. This same voltage powers the flash triggering electronics by providing a voltage potential of about 16 volts between a positive rail 37 and a negative rail 37'.

The detector 30 is responsive to the excitation of a flash tube and comprises an inductor 31 (L1) and a detector capacitor 33 (C1). The respective values of the inductor 31 and the detector capacitor 33 are selected in consideration of the flash environment typical in photography. The detector 30, by virtue of its proximity to the TTL strobe 14, is inductively coupled to the strobe'e flash tube. The detector capacitor 33 is selected so that the inductive energy received by the detector 30 is output as a detection signal 55.

In summary, the detector 30 is responsive to the inductive energy characteristic of flash tube operation and outputs a detection signal 35 indicative of firing. The combination of L1 and C1 is responsive to inductive energy and converts the same into the detection signal 55, which is provided to a verification circuit 32.

The detection signal 55 is applied to the verification circuit 32, which is comprised of an NPN transistor 35(Q1) 74 (such as 2N5089) and a load resistor 37 (R1). Before an inductive pulse is received by the detector 30 and sent to the verification circuit 32 as the detection signal 55, Q1 is conducting. Following the negative transition of the detection signal 55 indicative of a true discharge pulse, Q1 stops conducting, necessarily resulting in an input 52 to a delay circuit 34 being pulled up to the voltage on Q1's collector. The verification circuit 32 essentially acts as a switch which is responsive to whether or not strobe unit 14 has fired to specification. The receipt, by verification circuit 32, of a detection signal 55 indicative of a true discharge pulse, triggers the application of a verification voltage 51 to the input 52 of the delay 80.

When closed, a switch 54 (S1) shorts the input of the delay circuit 34 to the voltage of the negative supply rail 37', thereby preventing activation of the delay circuit 34. This switch 54 acts as an on/off switch for the flash triggering system 16. When the input of the delay circuit 52 goes positive due to the verification circuit 32, the delay circuit 34 is activated. The delay circuit is actually a monostable multivibrator 56 (such as Harris CD4047) in a "oneshot" configuration. The timing period of the delay circuit is set by a capacitor 58 (C2) and a resistor 60 (R2). These values are set so that the delay circuit outputs a pulse 1 millisecond after it receives the pulse from the verification circuit 32.

The output pulse from the delay circuit 34 passes through a coupling capacitor 68 (C3) and causes the activation circuit 36 to conduct, thus shorting the outputs 38, 38' of the triggering system. The activation circuit 36 also comprises a silicon-controlled rectifier 62 and a cathode to gate biasing resistor 70. As explained above, this shorting causes the slave strobe transmitter 18 to transmit the "fire" signal to the strobe flashes.

Figure 4:
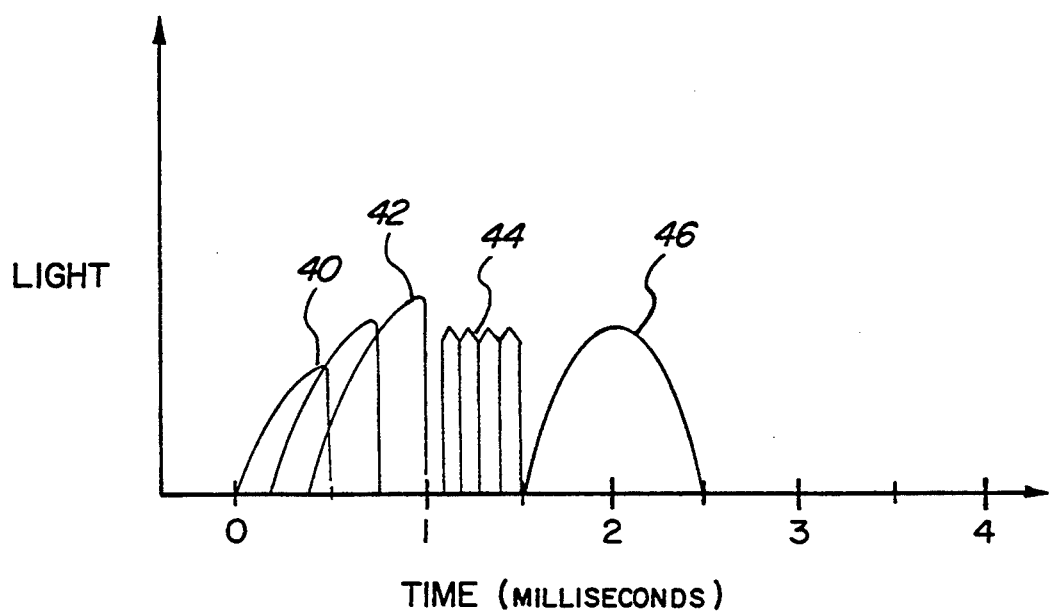
FIG. 4 is a timing diagram that illustrates the TTL flash and the response of the flash trigger.

A timing diagram, shown in FIG. 4, elucidates the entire process. A camera shutter opens at time 0 beginning the process. The shutter remains open for at least 4 milliseconds. During the first millisecond the TTL strobe goes through its preflash 40 and flash cycle 42. The preflash is detected by the above-described circuit and initiates the 1-millisecond delay of the delay circuit. After 1 millisecond the TTL flash has completed firing but the shutter is still open. The activation circuit 36 activates the slave strobe transmitter 18. It takes ½-millisecond for the transmitter to output the firing codes 44 (infrared pulses in this case). The slave strobes 10a, 10b (pulse 46) fire well before the shutter closes at 4 milliseconds.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A flash triggering system for determining the occurrence of a flash and providing a delayed output for activating remote strobes for use with a through-the-lens main strobe comprising:
   a housing member;
   means for removably mounting the housing member to be operatively-responsive to occurrence of a flash from a photographic strobe; and
   an electronic circuit disposed within the housing member, the circuit comprising:
      detection means for providing a detection signal in response to an occurrence of an electromagnetic pulse associated with the flash of the strobe;
      means responsive to the detection signal for outputting an amplified detection signal and;
      delaying means for outputting an activation signal through activation signal outputs a predetermined time after the receipt of the amplified detection signal,
   wherein, when a separate flash triggering device is connected to the activation signal outputs, the separate flash triggering device responds to the activation signal by transmitting signals which cause the remote strobes to fire.

2. The flash triggering system of claim 1, wherein a source of power for powering the verification means, the delay means and the activation means is provided by the separate device connected to the trigger so as to respond to the activation signal.

3. A flash triggering system for determining the excitation of a flash tube in photography and providing a delayed output comprising:
   a housing member;
   means for removably mounting the housing member to be operatively responsive to an excitation of a flash tube; and
   an electronic circuit disposed within the housing, the circuit comprising:
      an inductor, responsive to an electromotive force resulting from the excitation of the flash tube, for providing a detection signal;
      a transistor arranged to amplify the detection signal;
      a monostable multivibrator for responding to the amplified detection signal and outputting an activating signal about one millisecond after the receipt of the amplified detection signal; and
      a silicon controlled rectifier for completing a circuit between a first and a second output in response to the activating signal,
   so that when a separate flash triggering device is connected to the outputs, the separate flash triggering device responds to the completion of the circuit between the outputs by outputting a signal to fire remotely located strobe units.

4. A flash triggering system for determining the occurrence of a flash and providing a delayed output for activating remote strobes for use with a through-the-lens main strobe comprising:
   a housing member;
   means for removably mounting the housing member on a TTL strobe to be operatively responsive to occurrence of a flash from the TTL strobe; and
   an electronic circuit disposed within the housing member, the circuit comprising:
      detection means for providing a detection signal in response to an occurrence of an electromagnetic pulse associated with the flash from the strobe;
      means responsive to the detection signal for outputting an amplified detection signal and;
      delaying means for outputting an activation signal a predetermined time after the receipt of the amplified detection signal; and
   means connected to the activation signal for transmitting, in response to the activation signal, signals which order remote strobes to flash.

5. A flash detection system for determining the occurrence of a flash and providing a delayed output used for activating remote strobes for use with a through-the-lens main strobe comprising:
   a housing member;
   means for removably mounting the housing member on a TTL strobe to be operatively responsive to occurrence of a flash from the TTL strobe; and
   an electronic circuit disposed within the housing member, the circuit comprising:
      inductive detection means for providing a detection signal in response to an occurrence of an electromagnetic pulse associated with the flash from the strobe;
      means responsive to the detection signal for outputting an amplified detection signal and;
      delaying means for outputting an activation signal a predetermined time after the receipt of the amplified detection signal; and
   shorting means operatively connected to the activation
   signal for closing a circuit in response to the activation signal.

* * * * *